United States Patent
Koren et al.

(10) Patent No.: US 10,134,300 B2
(45) Date of Patent: Nov. 20, 2018

(54) SYSTEM AND METHOD FOR COMPUTER-ASSISTED INSTRUCTION OF A MUSIC LANGUAGE

(71) Applicants: Morel Koren, Petah-Tikva (IL); Tzipi Koren, Petah-Tikva (IL); Adoram Erell, Herzliya (IL)

(72) Inventors: Morel Koren, Petah-Tikva (IL); Tzipi Koren, Petah-Tikva (IL); Adoram Erell, Herzliya (IL)

(73) Assignee: COMMUSICATOR LTD., Petah-Tikva (IL)

( * ) Notice: Subject to any disclaimer, the term of this patent is extended or adjusted under 35 U.S.C. 154(b) by 0 days.

(21) Appl. No.: 15/767,672

(22) PCT Filed: Oct. 20, 2016

(86) PCT No.: PCT/IL2016/051136
§ 371 (c)(1),
(2) Date: Apr. 12, 2018

(87) PCT Pub. No.: WO2017/072754
PCT Pub. Date: May 4, 2017

(65) Prior Publication Data
US 2018/0308382 A1    Oct. 25, 2018

Related U.S. Application Data

(60) Provisional application No. 62/246,061, filed on Oct. 25, 2015.

(51) Int. Cl.
G10H 1/08    (2006.01)
G10H 1/06    (2006.01)
(Continued)

(52) U.S. Cl.
CPC ........... *G09B 15/04* (2013.01); *G09B 15/023* (2013.01); *G10L 25/51* (2013.01); *G10L 25/90* (2013.01)

(58) Field of Classification Search
CPC ........... G10H 1/0025; G10H 2210/331; G10H 1/0033; G06N 99/005; G06N 3/08;
(Continued)

(56) References Cited

U.S. PATENT DOCUMENTS

| | | | |
|---|---|---|---|
| 3,865,004 A * | 2/1975 | Coles ..................... | G09B 15/08 192/134 |
| 3,943,811 A * | 3/1976 | Coles ..................... | G10C 3/12 84/678 |

(Continued)

FOREIGN PATENT DOCUMENTS

| | | | |
|---|---|---|---|
| JP | 2006-259471 A | 9/2006 | |
| JP | 2007-513376 A | 5/2007 | |

(Continued)

*Primary Examiner* — Marlon Fletcher
(74) *Attorney, Agent, or Firm* — Soroker Agmon Nordman

(57) ABSTRACT

The subject matter discloses a computerized system to assist teaching and learning a written music language the system comprising a processor configured to obtain a reference music data object, wherein the reference music data object comprises a sequence of note properties, said note properties comprise one or more note parameters; extract the note properties from the music data object; determine an associated note syllable based on the note properties; generate a visual music notation according to the note properties, and generate a synthesized solfege singing sound according to the determined note syllable and the note properties; a display unit configured to display the music notation; and, an audio generation unit configured to output the synthesized solfege singing sound to a user of the computerized system.

12 Claims, 10 Drawing Sheets

(51) Int. Cl.
*G09B 15/04* (2006.01)
*G10L 25/51* (2013.01)
*G10L 25/90* (2013.01)
*G09B 15/02* (2006.01)

(58) Field of Classification Search
CPC .............. G10L 13/0335; G10L 15/00; G10L 2015/027; H04M 2203/305; G09B 15/00; G10G 1/04
See application file for complete search history.

(56) References Cited

U.S. PATENT DOCUMENTS

| | | | | |
|---|---|---|---|---|
| 4,771,671 A | * | 9/1988 | Hoff, Jr. | G10H 1/366 84/453 |
| 6,191,349 B1 | * | 2/2001 | Flam | G10H 1/0066 84/609 |
| 6,751,439 B2 | | 6/2004 | Tice et al. | |
| 8,244,546 B2 | * | 8/2012 | Nakano | G10H 1/366 434/318 |
| 8,921,677 B1 | * | 12/2014 | Severino | G09B 5/06 84/478 |
| 2002/0050206 A1 | * | 5/2002 | MacCutcheon | G09B 15/023 84/477 R |
| 2006/0150803 A1 | | 7/2006 | Taub | |
| 2008/0072738 A1 | * | 3/2008 | Plamondon | G10G 1/00 84/423 R |
| 2011/0252946 A1 | * | 10/2011 | Armstrong | G09B 15/023 84/483.2 |
| 2012/0067196 A1 | | 3/2012 | Rao | |
| 2013/0319208 A1 | * | 12/2013 | Forrest | G09B 15/002 84/478 |
| 2018/0174587 A1 | * | 6/2018 | Bermundo | G10L 15/26 |
| 2018/0197433 A1 | * | 7/2018 | Tavares | G09B 17/006 |

FOREIGN PATENT DOCUMENTS

| | | |
|---|---|---|
| JP | 2015-8842 A | 1/2015 |
| WO | 2017/072754 A2 | 5/2017 |

\* cited by examiner

SYSTEM AND METHOD FOR COMPUTER-ASSISTED INSTRUCTION OF A MUSIC LANGUAGE

FIELD OF THE INVENTION

The subject matter relates generally to a system and method to teach and learn a written music language and develop singing skills, assisted by a computerized device, and more specifically computer-assisted teaching, learning and practicing solfege.

BACKGROUND OF THE INVENTION

The music language is based on complex organized time-relationships between sets of acoustical characteristic of sounds. The music notation language is the written representation of the audible one and was—until the recording era—the only method to store, keep, transmit and disseminate music, as well as the only method to teach and learn complex music compositions. Thus, learning to read the music notation makes the difference between musical literacy and musical illiteracy.

Solfège is a method of performing music notation by singing the sol-fa syllables. Solfège is taught at many levels of music education, from primary through graduate level university study. Knowing solfège means to be able to read notes from a piece of written music, mentally hear the pitch, note-names, rhythmical pattern and intensity of the notes, and vocally produce the corresponding sounds. Solfège is a form of solmization, which is a system of assigning a distinct syllable to each note in a musical scale. Various forms of solmization are in use, and solfège is a commonly used form of Solmization in Europe, North and South America, and in Latin and Slavic languages countries. The terms "solmization" and "solfège" may be used interchangeably. In other countries, cultures and languages, the names of the syllables are different—as for example in Japanese, Chinese, Indian, Korean, Arabian and others.

The technique of solfège involves assigning the notes of a scale to particular syllables, and then practicing by singing different note sequences using these syllables. When studying solfège, the sequences typically become gradually more difficult, e.g. in terms of intervals and rhythms used.

The seven syllables commonly used for this practice in Latin and Slavic languages countries are: do, re, mi, fa, sol, la, and si (ti). In English speaking countries the system A, B, C (which corresponds to la, si, do and so forth) is also in use. The note names or note syllables, when referred to herein, are associated with the specific notation on score notes, e.g. one of do, re, m, fa, sol, la or si. In a classroom, music education by the solfege method means learning to interpret the written music notation with its related acoustic properties: pitch, duration and intensity, and practicing by singing the sol-fa syllables with one's own voice.

SUMMARY

It is an object of the subject matter to disclose a computerized system to assist teaching and learning a written music language the system comprising a processor configured to obtain a reference music data object, wherein the reference music data object comprises a sequence of note properties, said note properties comprise one or more note parameters; extract the note properties from the music data object; determine an associated note syllable based on the note properties; generate a visual music notation according to the note properties, and generate a synthesized solfege singing sound according to the determined note syllable and the note properties; a display unit configured to display the music notation; and, an audio generation unit configured to output the synthesized solfege singing sound to a user of the computerized system.

In some cases, the further computerized system configured to obtain an audio recording of one or more notes sung by a user.

In some cases, the further computerized system further configured to analyze the audio recording of the notes to generate an analyzed music data object corresponding to the reference music data object.

In some cases, the further computerized system further configured to compare the analyzed music data object with the reference music data object to determine an accuracy level of the audio recording; assess the accuracy of the analyzed music data object; and, display, via the display unit, the accuracy assessment of the audio recording to a user.

In some cases, the music data object is a standard MIDI file.

In some cases, the further computerized system further configured to provide a dynamic visual indicator displayed along the music notation simultaneously with the corresponding note in the synthesized solfege singing sound, to enable a user to follow the music notation while the note sound is audibly generated.

In some cases, the one or more note parameters comprise at least one of: a note pitch, note duration, note intensity, a note syllable, note timing, and a combination thereof.

In some cases, the music processor is further configured to recognize at least the sung syllable and the pitch of the sung syllable.

In some cases, the processor is further configured to use the pitch in the set of acoustic features used by the syllable recognition system.

In some cases, the computerized system is further comprising a communication unit configured to obtain a reference music data object from a server.

In some cases, the computerized system is further comprising a storage unit configured for storing reference music data objects.

In some cases, the music processor is further configured to generate a reference music data object from an input file.

In some cases, the music data object is a musicXML file.

In some cases, the accuracy assessment of the audio recording comprises at least a pitch assessment and a duration assessment.

In some cases, the accuracy assessment of the audio recording comprises an intensity assessment.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are optionally designated by the same numerals or letters.

DETAILED DESCRIPTION

The subject matter relates generally to a system and method to teach and learn music notation, solfege, and singing, through use of a computerized device, according to exemplary embodiments.

Figure 1:
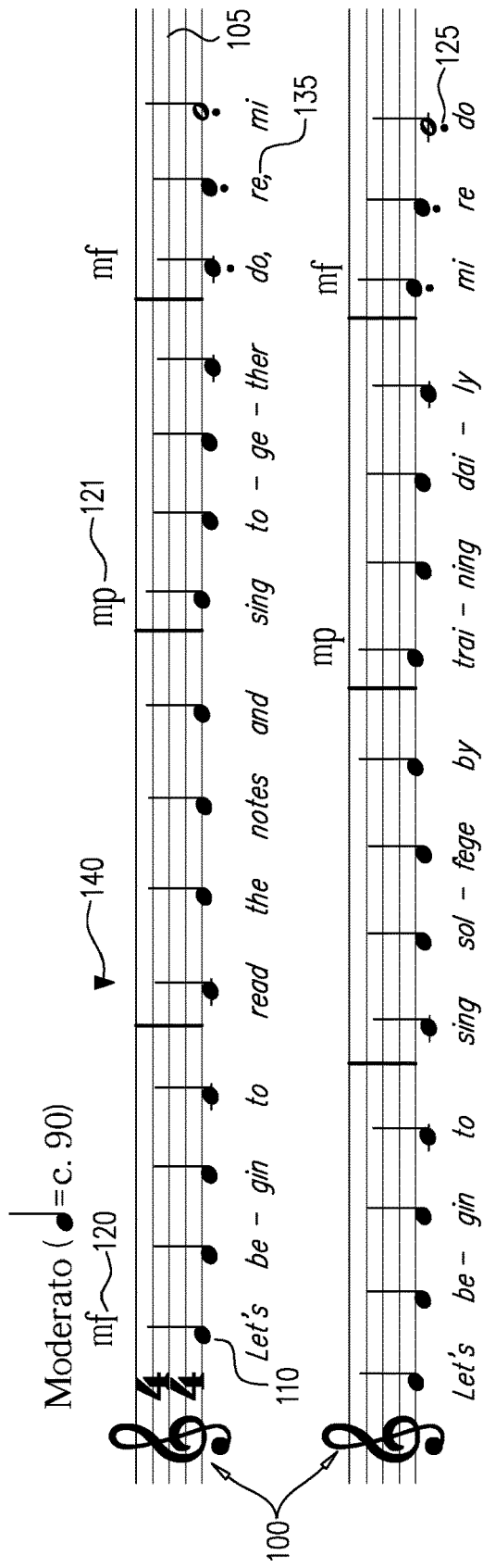
FIG. 1 shows a visual representation of music, with notation along with solfege syllables, according to some exemplary embodiments of the subject matter.

FIG. 1 shows an example of a music notation sheet. The music notation 100 comprises a five line staff 105 over which one or more notes are written or printed, here represented by a note 110. The placement or position of the note 110 on the five line staff 105 represents the pitch of the note while duration is represented by a distinct note shape. Furthermore, signs for intensity and intensity variation may appear on the music notation 100, to indicate an intended to intensity of sounds during performance, e.g. mezzo-forte (mf) 120 for singing a note moderate loudly, or mezzo-piano (mp) 121 for singing a note moderate softly. The notation is read from left to right and from top to bottom.

The student of solfege learns to read such music notation sheets and sing the note 110 at the appropriate pitch, timing, and intensity, using his own voice. Singing the note means articulating the associated solfege syllable 135 (e.g. one of do, re, me, fa, sol, la or si). The syllables 135 do not appear on the musical sheet 100; rather, the student is required to memorize the relation between the notes position (or pitch) and their names. Articulating the syllables enhances this memorizing process. In some cases, the visual display may provide a visual indicator 140 that shows which note is sounded by the computer program during the play-back.

In classroom conditions students may practice only collective solfege singing under the teacher's guidance, while individual practicing at home is almost impossible due to the absence of adequate professional guidance and assistance. Many modern music curricula for public schools requests and recommend using solfege, but it is hardly achieved and music language education is reachable in practice only to students who learn to play a musical instrument.

There exist computer programs that assist in music education. However, none of the existing programs teach solfege, e.g., singing out of the musical notes written in score, while articulating the notes names. For example, the program "Sight-Singing®" generates a melody out of written notes but the sound is that of an electronic synthesizer rather than an articulation of the note-names by a human or human-like voice. Also, this program can record an input singing, analyze the pitch of the voice and indicate to the singer whether the pitch was too low or too high, as well as indicating whether the duration is correct. However, it does not recognize, nor gives feedback on any other parameter of the sound: not on the articulated text/solfege, not on the timing, and not on the intensity. Hence "Sight-Singing®" is not suitable for assisting in learning solfege.

There exist computer programs that synthesize a human-like singing. For example, the software product called "Vocaloid®" accepts an input melody and input lyrics to go with it, and synthesizes a human-like voice that sings the lyrics according to the melody. None of these programs display to the user an indication of the played notes, nor enable recording of an input singing and giving feedback to the singer on the accuracy of his performance. Therefore, they cannot be used for assisting solfege learning.

There also exist speech-to-text programs that recognize a spoken textual content out of an audio signal. Such programs could theoretically be bundled with programs like sight-seeing to produce feedback on the sung notes names. However, speech-to-text programs use machine-learning methods which utilize many recordings of human speech for building statistical models of the acoustic properties of speech signals, and their accuracy deteriorates if the speech is sung rather than spoken. In addition, they do not provide information on the pitch, timing, duration and intensity of each recognized syllable. Therefore, they are insufficient for appropriate assisting of solfege learning.

One technical solution according to the disclosed subject matter is providing a system and method in which a computerized device is configured to provide a user with a visual and auditory solfege instruction tool for assisting in learning the music language. The computerized device uses music data objects of music notation and note sound. The music data object may be a digital data structure that comprises note related data for one or more notes, e.g. a song, a musical segment, or a portion thereof. The subject matter includes presenting, for example, visually, the musical score on the screen, and enables the user to simultaneously sound the notes audibly as solfege singing, e.g. the computerized system articulates the note name in the correct pitch, duration and intensity. This enables the user to learn these auditory characteristics of the note and to become familiar with the music language.

Another technical solution of the disclosed subject matter is using a recording of the user singing to provide feedback and accuracy assessment of the user singing performance. The computerized device analyzes the recorded singing and presents the feedback in real-time, offering instant representation of the pitch, duration, intensity, syllable and/or tempo of the sung note, on the existing score, enabling the user to view a comparison of the original score with the user's performance.

This subject matter describes a complete and dedicated solution for assisting solfege education. It incorporates several components that exist in products, for example, Vocaloid®, Sight-Singing® and speech-to-text products, but provides additional components that are not part of such products. Particularly, superior accuracy in the analysis of the recorded singing is established by taking into account knowledge of the expected sung note sequence, based on a corresponding reference music data object which includes at least one of the pitch, duration, intensity, syllables and tempo of the note sequence, and the expected correlation between the expected sung syllables and the pitch of the syllable segments. The said knowledge is not taken into account in speech-to-text programs. The combined analysis of syllables and pitch enables more accurately estimating other signal parameters, which need to be fed back to the user, e.g. timing, duration, and intensity of the sung notes.

Embodiments of the invention may include an article, such as a non-transitory computer or processor readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein. The processes and displays presented herein are not inherently related to any particular computer or other apparatus. Various general purpose systems may be used with programs in accordance with the teachings herein, or it may prove useful to construct a dedicated device to perform the desired method. It will be appreciated that a variety of programming languages may be used to implement the embodiments of the invention as described herein.

Figure 2:
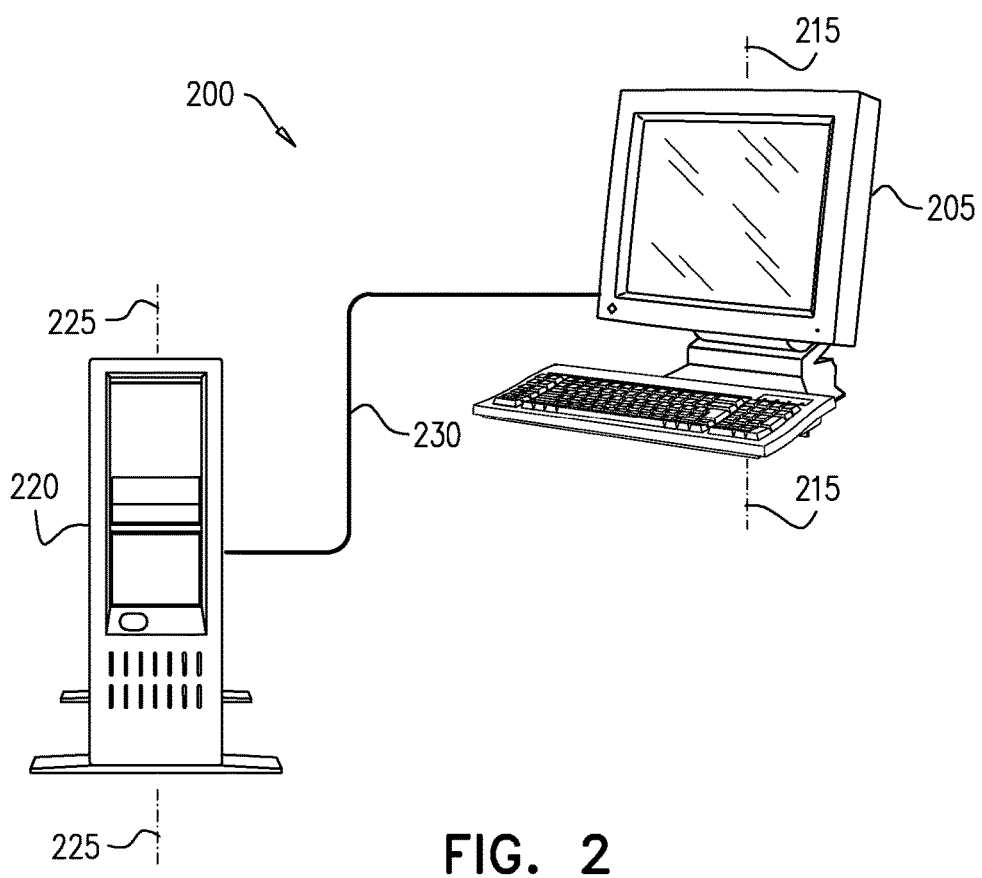
FIG. 2 shows a system configured to assist in instruction of a musical language, according to some exemplary embodiments of the subject matter.

FIG. 2 shows a system to teach solfege and musical sight-singing, according to some exemplary embodiments of the subject matter. The system 200 comprises one or more computerized devices, illustrated as an instance of a computerized device 205, representing any number of computerized devices 205, as indicated by dashed lines 215. The computerized device 205 may be a desktop computer, a laptop, a tablet, a smartphone, or the like. The computerized device 205 comprises a storage device for storing computer executable software or application, which, when executed by a processing unit, enable a user of the computerized device 205 to learn a musical language using the computer executable software or application. The computerized device 205 may include or may be operationally connected to an article, such as a non-transitory computerized system or processor-readable storage medium, e.g. a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein. The computer executable software or application executes computer readable files or music data objects comprising note-related properties. The note-related properties comprise data for generating a music notation and a note sound of the music data object. The music data object comprises a sequence of one or more notes, where each note comprises at least one of the following properties: a note pitch, note duration, note intensity, and the syllable associated with the note. The music data object may be provided as a readable digital file comprising music data, for example, a SMF—standard MIDI file, music-XML, or similar digital music file, as disclosed and incorporated by reference in www.midi.org/specifications/category/complete-midi-1-0-detailed-specification, www.midi.org/articles/an-intro-to-midi and/or usermanuals.musicxml.com/MusicXML/MusicXML.htm.

The system 200 further comprises one or more servers, illustrated as an instance of a server 220, representing any number of servers 220, as indicated by dashed lines 225. The server 220 generally stores the music data objects, for example reference music data objects, which are used to generate a sequence of note related representations, e.g. an audible note sound and a visual note related representations, to enable the user to learn the music language. The computerized device 205 is configured to access the server 220 to obtain the music data objects. In some non-limiting embodiments, the server 220 manages user access to the music data objects, for example, only allowing registered users access to the music data objects.

In some non-limiting embodiments, the one or more computerized devices 205 are operationally connected or linked or coupled there between to the instances of one or more servers 220, the connection or linkage illustrated and represented by a network 230. The network 230 may comprise one or more manners of communication between the one or more computerized devices 205 and the one or more servers 220. For example, the network links enables operationally connecting the one or more computerized devices 205 and to the one or more servers 220 through wired communication, wireless communication, LAN, WAN or the like.

Figure 3:
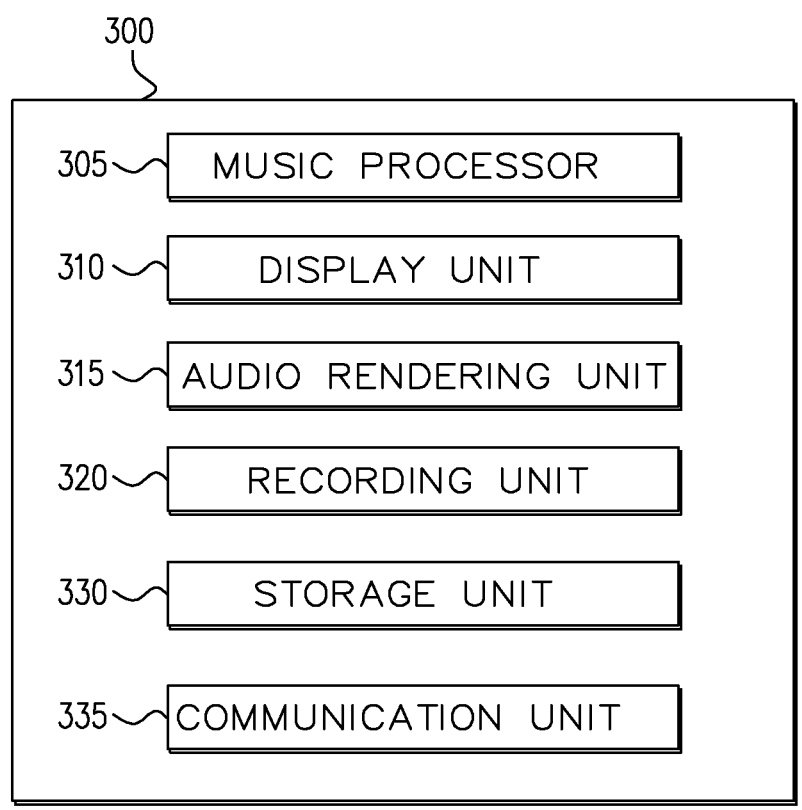
FIG. 3 shows a computer device configured to assist in instruction of a musical language, according to some exemplary embodiments of the subject matter.

FIG. 3 shows a computerized device 300 configured to assist instruction of a music language according to some exemplary embodiments of the subject matter. The computerized device 300 comprises a music processor 305 and a display unit 310, which displays and enables the user to visually see a music notation of the reference music data object. The computerized device 300 comprises an audio generation or audio rendering unit 315, which generates a synthesized solfege singing sound and enables the user to hear the synthesized sound. The computerized device 300 comprises an audio recording unit 320, which enables a user to record his/her own solfege singing performance, e.g. a microphone. The computerized device 300 comprises a storage unit 325. The computerized device 300 may comprise a communication unit 330, which enables the computerized device 300 to communicate with the server 220 to obtain one or more reference music data objects for use by the user of the computerized device 300.

In some cases, the user may further upload music data objects to the server 200 for use by other users, and the music data objects may be accessed remotely from the server 200, e.g. via a network interface.

Figure 4:
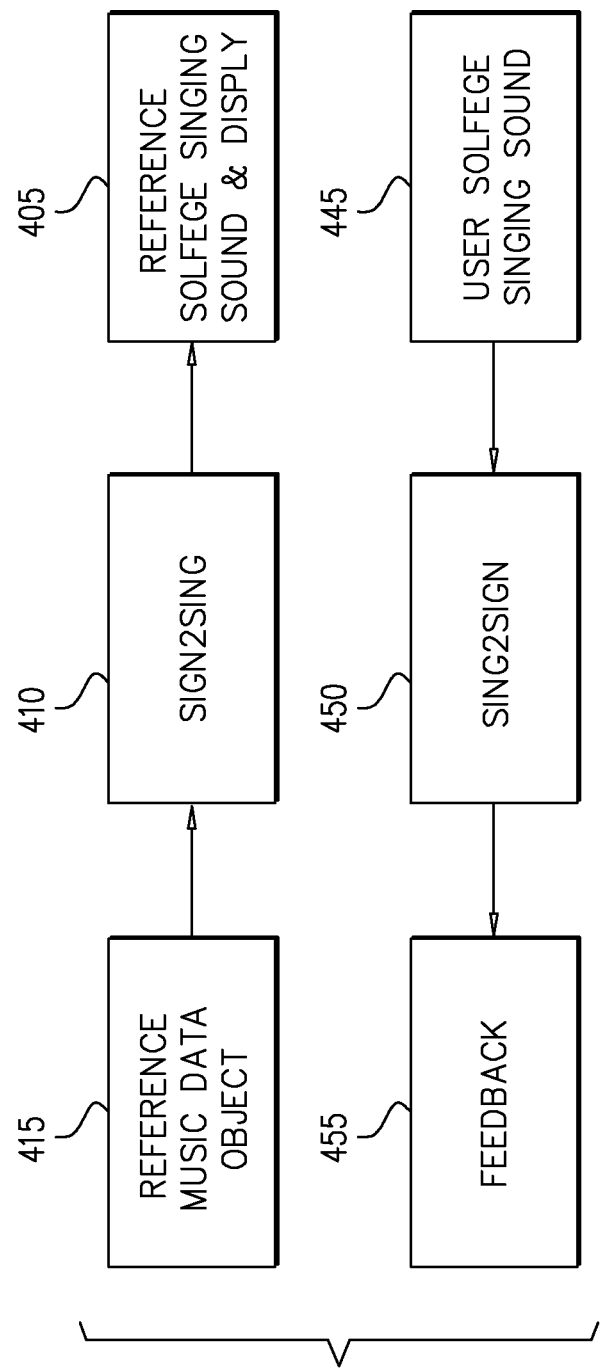
FIG. 4 shows a schematic illustration of a two main functional components of a system, e.g. a sign2sing synthesis mechanism and a sing2sign analysis mechanism, according to some exemplary embodiments of the subject matter.

The music processor 305 comprises a sign2sing unit 410 of FIG. 4, which receives a reference music data object 415 as input, displays the written notation of the reference music and generates an audible sound, which is a synthesized solfège singing of syllables with their pitch, duration, intensity and tempo as inferred from the reference music data object.

The music processor comprises a sing2sign unit 450 of FIG. 4, e.g. sing2sign analysis module, which obtains a solfege sung sound performance 445 of the user, analyzes the sung performance according to a corresponding reference music data object to generate an accuracy assessment of the user's accuracy according to various properties such as pitch accuracy, duration accuracy, intensity accuracy, tempo accuracy and syllable accuracy, or a combination thereof, and generates visual feedback 455 to the user on the accuracy of his/her singing input.

FIG. 4 shows a schematic illustration of two main functional components of a system, e.g. a sign2sing synthesis module and a sing2sign analysis module, according to some exemplary embodiments of the subject matter. The storage unit 330 of FIG. 3 stores one or more reference music data objects that are accessible to the user of the computerized device 300 of FIG. 3. Each reference music data object of the one or more reference music data objects may store data relating to a different note sequence. The music data object and note related data are further described in FIG. 6 herein.

Figure 5:
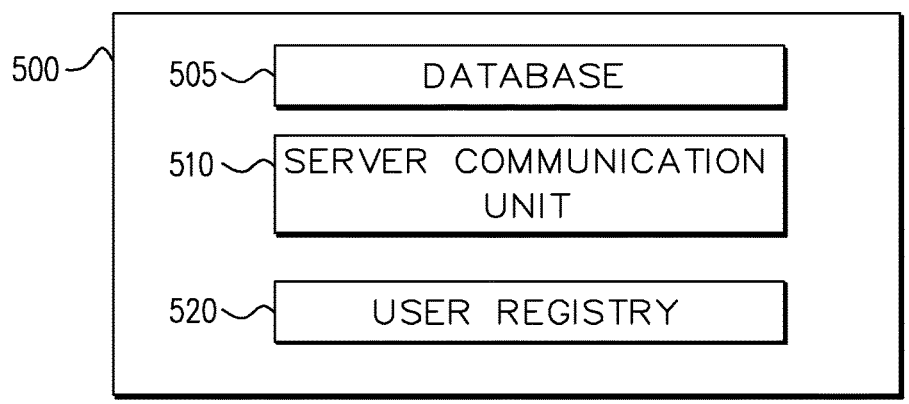
FIG. 5 shows a server of a system configured to assist in instruction of a musical language, according to some exemplary embodiments of the subject matter.

FIG. 5 shows a server of a system configured to assist instruction of the music language according to some exemplary embodiments of the subject matter. The server 500 comprises a server database 510, which stores music data objects. The music data objects are stored at the server 500 to enable the one or more computerized devices 205 of FIG. 2 to access the music data objects. The server 500 comprises a communication unit 515, which enables the server 500 to communicate with the one or more computerized devices 205. The communication unit 510 transmits music data objects to the computerized device 205. The communication unit 510 is also configured to receive music data objects from the computerized devices 205, the music data objects are stored in the server database 505 and may then be accessible by other computerized devices of the one or more computerized devices 205.

The server 500 comprises a user registration unit 520, which stores data related to registered users that may access the server 500 and obtain the music data objects. For example, the user registration unit 520 stores information relating to users of computers in public schools, e.g. music teachers or students, to enable a user to perform one-time registration, and obtain or upload music data objects. The computer 205 accesses the server 500 by providing a user name and a password that are stored in the user registration unit 520. Once logged in, the user of the computer 205 may access the music data objects and use the content for teaching students the music language.

Figure 6:
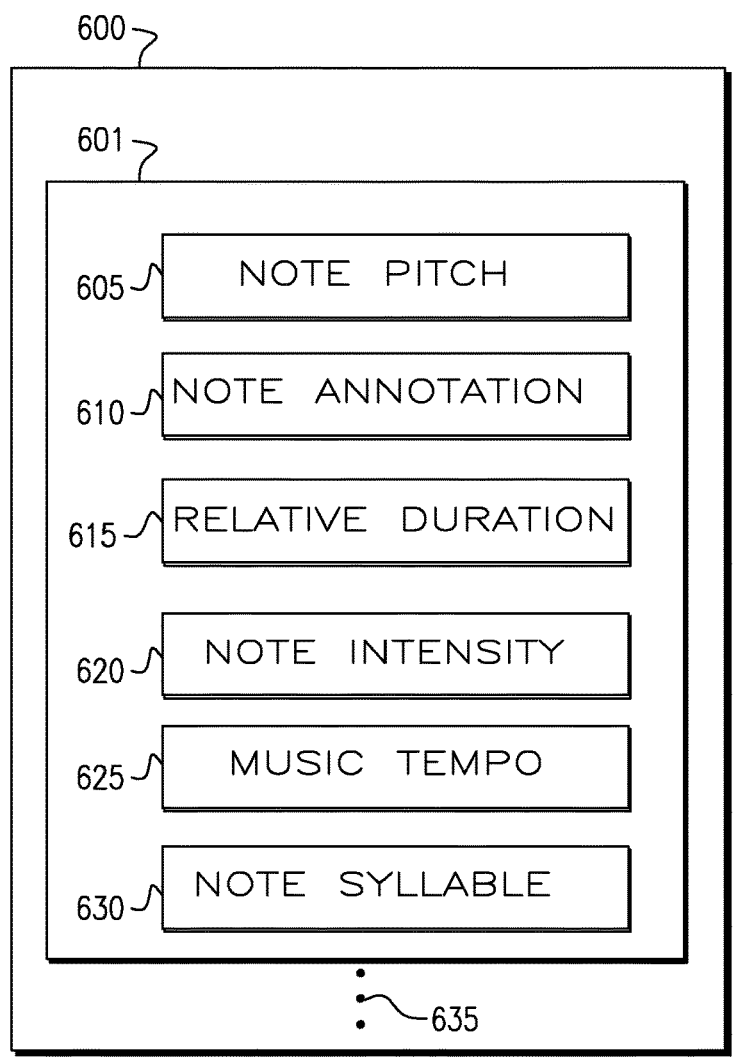
FIG. 6 shows a music data object, according to some exemplary embodiments of the subject matter.

FIG. 6 shows a music data object according to some exemplary embodiments of the subject matter. The music data object 600 comprises a plurality of notes, for example a sequence of notes. Each note may be associated with a set of corresponding note-related data or note properties 601. Each set of note properties 601 may comprise at least one of note pitch 605, note duration 615, note intensity 620, music tempo 625, note annotation 610, and note syllable 630. The music data object 600 may represent a musical segment or a music composition or a portion thereof.

The note pitch 605 comprises a value that corresponds to a frequency of the note, e.g. the note la of the fourth octave may have a frequency of 440 Hz.

The note duration 615 comprises values such as one-eight's, a quarter, a half, a full, and alike. The said note durations are associated with relative time durations, for example a half note has a duration which is double the duration of a quarter-note.

The music tempo 625 comprises a time-related value that corresponds to the physical duration of notes within some segment of the note sequence, for example the time duration measured in milliseconds of all quarter notes in the said segment. In other embodiments the tempo may correspond to the physical duration of one-eight notes, quarter-notes or half notes. The tempo may be constant for the whole note sequence or take different values in different segments of the note sequence.

The note intensity 620 comprises a value associated with a relative intensity of the note, for example, whether the note is emphasized or louder than other notes in the note sequence depicted in the musical data object.

The note syllable 630 comprises the name or syllable associated with the note, for example, the note syllable do. In some cases, the note syllable 630 may comprise one or more syllables.

The note annotation 610 indicates the graphic representation of the note for a visual display of the note, for example, the display on the display unit 310 of FIG. 3. The note annotation 610 is related to the other components of the note properties 601 of each note in the note sequence represented by the music data object 600, e.g. note annotation 610 may be computed according to the note pitch 605, the note intensity 620, or the like, to enable generating an accurate graphic music notation of each note in the note sequence. An exemplary note annotation 610 is displayed in FIG. 1.

The music data object 600 may comprise a sequence of notes, each note associated with note properties 601, represented here as three dots 603, where the sequence of notes comprises one or more notes and their associated note properties 601. The sequence of notes along with their corresponding note properties 601 enables generating an audible and visible representation of the sequence of notes.

It is noted that the music data object 600 as provided herein, may be a reference music data object and/or an analysis music data object.

Figure 7:
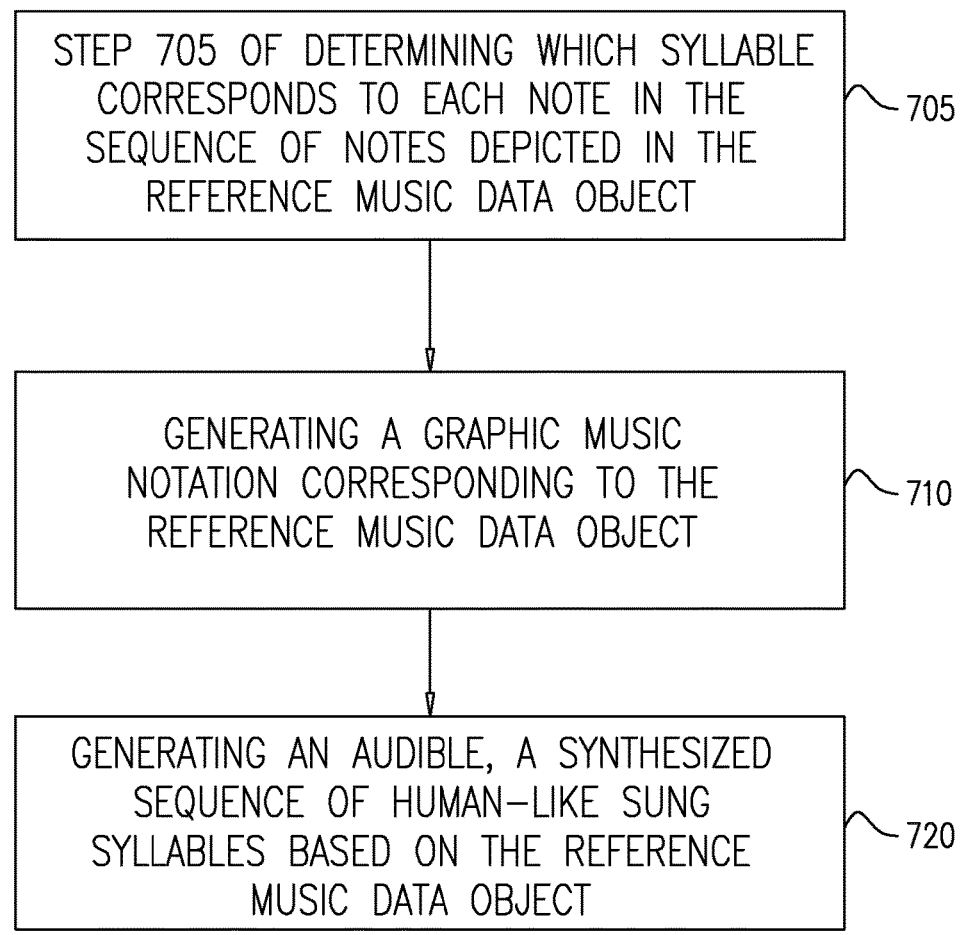
FIG. 7 shows a method of outputting a solfege note sound and a music notation, according to some exemplary embodiments of the subject matter.

FIG. 7 shows a method performed by the sign2sing unit 410 of FIG. 4 to generate a visual music notation and a synthesized audio segment, according to some exemplary embodiments of the subject matter. The sign2sing unit 410 is configured to perform step 702 of obtaining a reference music data object. For example, the reference music data object is obtained from the storage unit 325 of FIG. 3 or from the server 205 of FIG. 2. In some exemplary embodiments of the subject matter, the obtained reference music data object may be generated from an input file, for example, from pdf filed, image files, text files, video files, or the like.

The sign2sing unit 410 is configured to perform step 705 to determine a reference syllable sequence that correspond to the sequence of notes represented by the reference music data object. In some embodiments of 705 the reference syllable for each note of the note sequence is stored explicitly in the note related data and may be obtained directly. In some embodiments of 705 the reference syllables are not stored in the music data object and they are determined according to the pitch property of the notes. An exemplary reference syllable sequence may be, for example, "do-re-me-do-re-si-do-re-fa".

The sign2sing unit 410 is configured to perform step 710 of generating a graphic music notation corresponding to the reference music data object. The graphic music notation is output from the sign2sing unit 410 and may be displayed on a display unit 310 of the computerized device 300, for example, on a computer screen. The graphic music notation enables the user of the computerized device 300 to read the musical notation while the note sound is sounded by the audio rendering unit 315 to further familiarize the user with the relation between the graphic musical notation and the acoustic properties of the corresponding music sound. The music notation may include the written notes annotation, duration indication based on the shape of the note representation, tempo (e.g. moderato), and a dynamic indicator e.g. 140 which shows a current note being played.

The sign2sing unit 410 is configured to perform step 720 of generating an audible, synthesized sequence of human-like sung syllables based on the reference music data object, which may be generated, for example, by the audio rendering unit 315 of FIG. 3. The synthesized note sound sequence may be sounded to a user of the computerized device 300 of FIG. 3, thus enabling the user to hear the note sounds and learn their pitch, duration, tempo, associated syllables and their intensity, while following the dynamic visual indicator which may be displayed along the music notation, e.g. substantially simultaneously as the current note is being sounded According to some exemplary embodiments of the subject matter, the synthesized sequence is implemented as a special case of a text to speech engine. A text to speech engine comprises a data set of elementary acoustic-phonetic units in the form of a digital acoustic signal, rules how to concatenate elementary units to one another, and a prosody component, which determines the pitch, duration and intensity of the elementary units according to a set of rules of where and how should an emphasis occur in each of the words, and where should an emphasis occur in the sentence. Different text to speech implementations choose different sets of elementary acoustic-phonetic units. In the disclosed subject matter, solfege synthesis is implemented by choosing for acoustic-phonetic units the note-names syllables, e.g. do, re, mi, fa, sol, la, si, and by replacing the prosody rules by the note-related properties. e.g., the pitch, duration and intensity of the elementary units are determined according to the note properties or related note data.

According to some exemplary embodiment of the subject matter, the graphic music notation corresponding to a particular music data object is displayed to the user, e.g. via the display unit 310, when the user selects the said music data object. According to some embodiments of the subject matter, the corresponding sound is generated when the system receives indication, e.g. from a user, to provide the sound, for example, by receiving a command to generate the sound that may be output via the audio rendering unit 315. According to some exemplary embodiments of the subject matter, simultaneously or substantially simultaneously with the corresponding sound that is output via the audio rendering unit 315, a dynamic or moving visual mark 140 may be displayed on the graphic music notation 100 whose position at any given moment indicates the sounded note at that moment.

Figure 8:
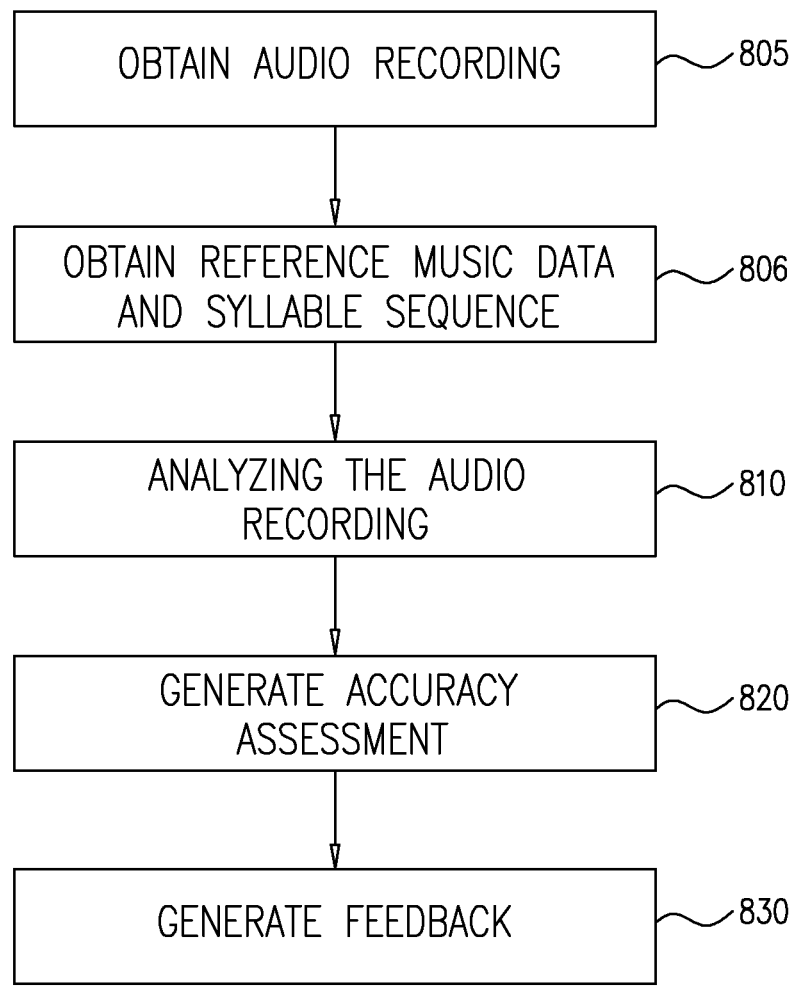
FIG. 8 shows a sing2sign unit for providing feedback on an accuracy of a sung recording, according to some exemplary embodiments of the subject matter.

FIG. 8 shows a sing2sign unit for performing a method to analyze recorded input of a music segment sung by a user, and to generate feedback regarding an accuracy of a sung recording, according to some exemplary embodiments of the subject matter. The sing2sign unit 450 of FIG. 4 may be a software module, e.g. executed by a processing unit which is configured to perform step 805 of obtaining an audio recording, for example by activating the audio recording unit 320 of FIG. 3 and storing the recorded audio in a storage unit.

The sing2sign unit 450 is configured to perform step 807 to obtain the reference music data object and all the corresponding note related data which has been extracted by the sign2sing unit 410.

The sing2sign unit 450 is configured to perform step 810 of analyzing the recorded audio, e.g. the solfege segment sung by the user. The analysis includes converting the user's sung recording into an analyzed music data object. The analysis includes analyzing parameters of the sounds sung by the user, for example, time segmentation, in order to determine a sequence of distinct notes and their related note properties, e.g. pitch, timing, duration, intensity, and sung syllable of each note. When used herein, note-timing indicates the onset or start time of the sung syllable, for example measured from the beginning of the recorded audio, or relatively, e.g. from the end of the previous determined note.

In some cases, at least the sung syllable and the pitch of the sung syllable are recognized by the music processor 305 to enable analyzing the sung recording. An analyzed music data object may be generated based on the output of the analysis unit 810. e.g. by storing a value calculated for each note property (e.g., including pitch, duration, tempo, syllable and intensity) associated with a note in the sequence of notes provided in the corresponding reference music data object. The method of step 810 is further described in FIG. 9 herein.

The sing2sign unit 450 is configured to perform step 807 to obtain the reference music data object and all the corresponding note related data which has been extracted by the sign2sing unit 410, including the corresponding reference syllable sequence which has been determined by step 705.

The sing2sign unit 450 is configured to perform step 820 to generate an accuracy assessment of the performance of the user, based on the recorded audio. The sing2sign unit 450 compares the analyzed music data object to the corresponding reference music data object to determine an accuracy assessment of the sung recording. The accuracy assessment is quantified, for example, as differences or ratios between the analyzed, e.g. the analyzed music data object generated from the sung recording, and reference parameters, e.g. the reference music data object.

The accuracy assessment may be performed via an accuracy-quantization table which converts the accuracy values to one of several indications regarding the severity of the inaccuracy, e.g., the table may contain a range of values, for example indicating whether the pitch deviation of a determined note in the recorded audio is within a reasonably close range to the correct pitch, is somewhat close to the correct pitch or is totally incorrect. In some cases, the accuracy-quantization table may be stored, for example, in the storage unit 325 of FIG. 3. For example, a deviation which is below a first value is considered as no error, while a deviation between the first and a second value is considered a small error, and a deviation above the second value is considered a severe error. The table may also indicate a direction of the error, e.g., a small too low pitch error or a severe too high pitch error.

Figure 11:
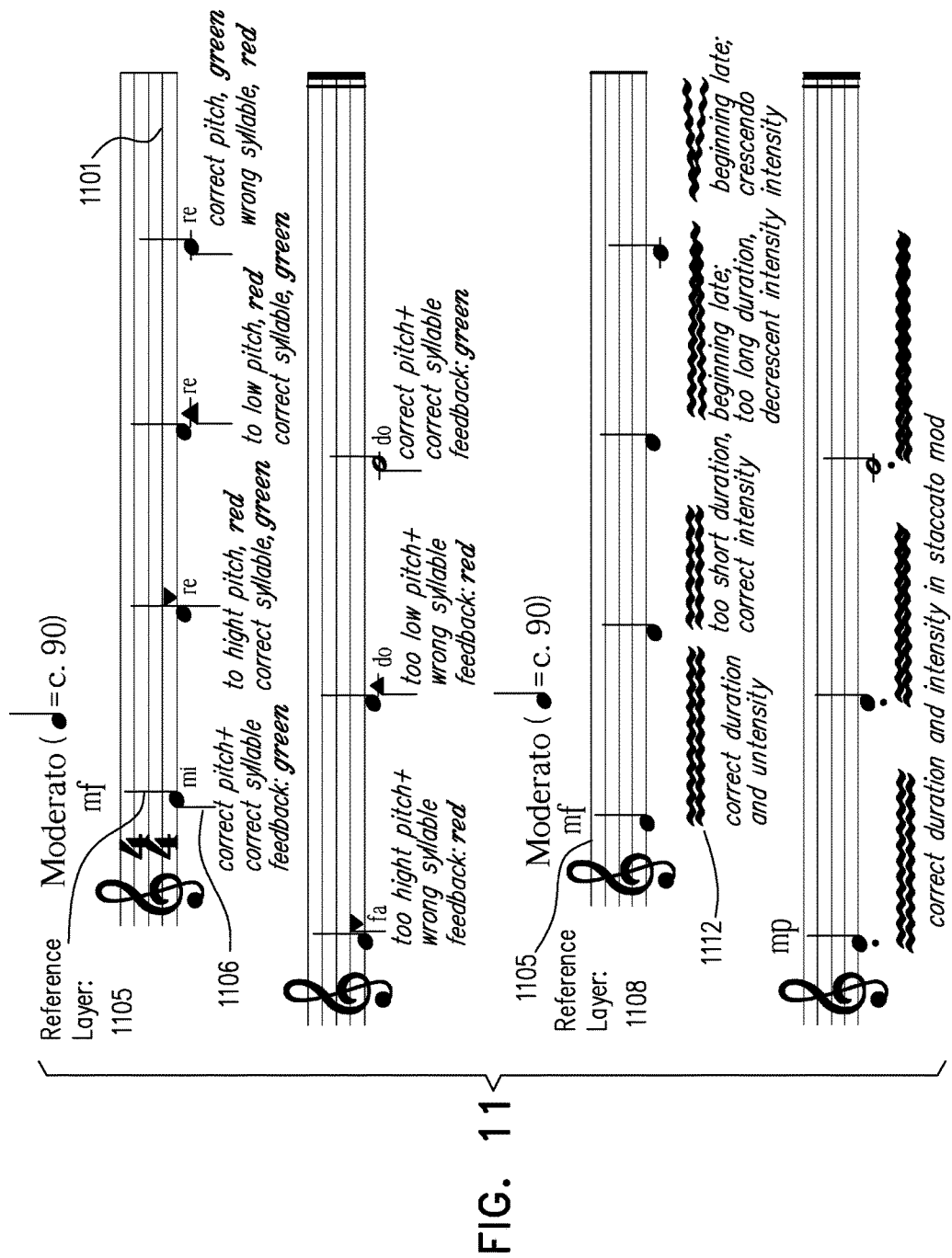

In one exemplary embodiment, the accuracy assessment is achieved by first converting the analyzed music data object to a quantized music data object which is similar or identical in its format to the reference music data object, e.g. the same type of data structure. For example, the reference music data object may indicate the notes pitch by one out of 7 possible values for each Octave. Converting the analyzed music data object to the same format may include that the analyzed pitch values are quantized to one of the said 7 possible values. For example, if the analyzed pitch is between "do" and "re", it will be quantized to either "do" or "re", whichever is closer. After the said conversion, the music processor 305 is configured to perform step 820, the accuracy assessment comparison of the analyzed object with the reference music data object and determine any differences. The differences may be determined as an error, which is then provided to the user as part of the feedback, as seen in FIG. 11. For example, the feedback may indicate that the user sang a note pitch that sounds like "re" instead of "mi".

The sing2sign unit 450 is configured to perform step 830 to generate a feedback representation, which represents the accuracy assessment in form of visual feedback for the user. For example, the feedback may be a visual representation showing one or more indications, for example a message, a graph, a bar, a chart, a scale, or the like, indicating an accuracy level of various parameters that were determined from the sung recording, such as pitch accuracy, note-syllable pronunciation accuracy, begin and end timing accuracy, note duration accuracy, tempo accuracy and intensity accuracy, for example for each note in the note sequence depicted in the music data object, as is shown in some exemplary embodiments in FIG. 11.

Figure 9:
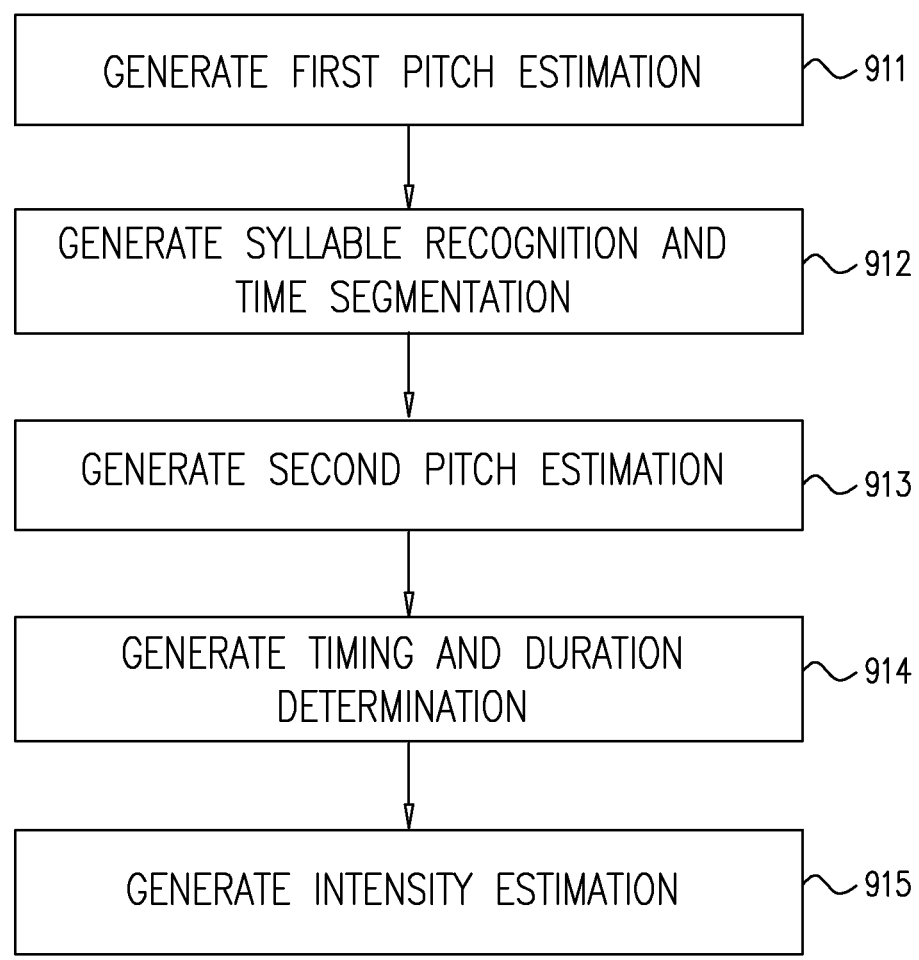
FIG. 9 shows a method for analyzing the parameters of a sung recording in order to provide feedback on the accuracy of the sung recording, according to some exemplary embodiments of the subject matter.

FIG. 9 shows a method for analysis of a sung recording to obtain analyzed parameters of the sung recording in order to provide a feedback of the accuracy of the sung recording, according to some exemplary embodiments of the subject matter. The method may be performed, for example, using a processor of a computerized system. Step 911 discloses generating a first pitch estimation. Generation of the first pitch estimation is based on an estimation of a pitch value and periodicity measure by an Autocorrelation-based method, for example, in the method disclosed and incorporated by reference in Parsons, "Voice and Speech Processing", McGraw Hill, ISBN 0-07-048541-0, 1986, Chapter 8 ("Parsons") and S. A. Zahorian and H. Hu, "A spectral/temporal method for robust fundamental frequency tracking," J. Acoustical Society America 123(6), June 2008 ("Zahorian").

In another exemplary embodiment of the subject matter, the first pitch estimation is estimated via a Cepstrum-based method, e.g. as described and incorporated by reference from Parsons. In another exemplary embodiment of the subject matter, the pitch estimation is derived to from a combination of the said Autocorrelation-based or Cepstrum-base methods, or a combination thereof, or other related methods known to one skilled in the art.

In step 911, independent pitch estimates are generated per frame, e.g. as raw pitch estimates, where frames are short segments of the voice signal, which may range, for example, from 10 to 100 milliseconds long. The first pitch estimation generates a per frame pitch value and a periodicity measure. The said periodicity measure at a given time frame is known to be correlated with the extent to which the signal in the said time frame belongs to a vowel.

Step 912 discloses performing syllable recognition and time-segmentation. The syllable recognition and time-segmentation is obtained via, for example, a specialized version of a speech-to-text engine, for example, as disclosed and incorporated by reference in X. Huang, A. Acero and H. Hon, "Spoken Language Processing", Prentice Hall, ISBN-13-022616-5, 2001 ("Huang"). The specialized version of the speech-to-text methods generates a most probable syllable sequence corresponding to the recorded signal, and a corresponding indication of the beginning and end time of each syllable, for example the probable syllable sequence schematically illustrated in FIG. 10.

It is noted to one skilled in the art that state of the art speech-to-text engines rely on statistical models of the phonetic units that need to be recognized, and comparing the recorded signal to these statistical models. In one exemplary embodiment, the statistical models may be implemented using Hidden Markov statistical models. The statistical models are generated, as known in the art, in an earlier, training phase using a database of acoustic recordings. The models consist of a set of predetermined mathematical functions, which are characterized by a set of predetermined parameters, where each phonetic unit comprises different values for the predetermined parameters. Each phonetic unit is modelled according to a sequence of states, which are not directly observed, and where each state is characterized by a probability distribution of the observed acoustic features, where the said probability distribution is known in the art as the output or emission probability.

Typically for speech to text engines, the said acoustic features over which the said output probability is defined comprise cepstral coefficients corresponding to a time-frame. The set of predetermined parameters that characterize a syllable consist of the transition probabilities between states and the output probability parameters corresponding to each state. The said set of predetermined parameters is generated from the database of recordings. In addition, a set of predetermined transition probabilities between phonetic units, referred to by one skilled in the art as "Grammar", is typically generated from a large database of text whose context is similar to that expected at the recognition time. At recognition time the recognizer scores probabilities of possible sequences of the phonetic units, and searches for the most probable sequence.

In some exemplary embodiments of the subject matter, syllable recognition as performed in the present subject matter in step 912 deviates from the state-of-the-art speech-to-text as disclosed above regarding the said acoustic features. The acoustic features include, in one embodiment, in addition to cepstral coefficients used in the state-of-the-art speech to text, also a pitch value and a periodicity-measure value. The output probabilities include, in addition to the probability distribution over the cepstral coefficients used in the state-of-the-art, also probability distribution over pitch values, and a partial weight of the said probability distribution in the overall output probability which is determined by the periodicity-measure.

In one embodiment, the syllable recognition deviates from the state-of-the-art speech-to-text in the choice of elementary phonetic units. The said phonetic units comprise the Solfege syllables plus a silence unit, which detects a silence period. In contrast to state of the art, multiple phonetic units per syllable are assigned to syllables that are sung in different octaves. In some embodiments, the number of octaves is configurable.

In some exemplary embodiments of the subject matter, each syllable is modelled by at least two Hidden Markov Model states where at least the first state corresponds to the consonant and at least the last state corresponds to the vowel.

In some exemplary embodiments of the subject matter, a phonetic unit of a short pause is added to the phonetic units set.

In some exemplary embodiments of the subject matter, the grammar, used for the syllable recognition, is configured such that all transitions between all syllables are possible, but a higher probability, denoted herein by Pe, is assigned to transitions between syllables that are consistent with the reference syllable sequence, as extracted from the reference music data object that corresponds to the analyzed recorded audio segment. Pe is a configurable parameter. The said grammar allows the syllable recognition operation 912 to detect erroneous sequences, but weights such erroneous sequences with lower probability.

In some exemplary embodiments of the subject matter, the grammar, used for the syllable recognition, is configured such that it includes transitions to syllable states that are one octave higher or one octave lower than the reference music.

In some exemplary embodiments of the subject matter the syllable recognition operation 912 comprises using acoustic features which do not include pitch-related information. In some embodiments, the generation of the first pitch estimation and the syllable recognition can be reversed, and the first and second pitch estimations may be integrated into one pitch estimator unit.

In some exemplary embodiments of the subject matter the syllable recognizer output probability is modelled by a mixture of multivariate Gaussians distributions. In some exemplary embodiments of the subject matter the output probability is modelled by a neural network.

The output of the syllable recognition may include more details than state of the art speech to text, for example. The output of the syllable recognition operation 912 may comprise a most probable sequence of syllables, a most probable begin and end time of each syllable, and a most probable begin and end time of the vowel state in each syllable, or the like.

During the analysis step 810, the processor obtains syllable recognition data from a syllable recognition database 816. The syllable recognition database 816 may be stored, for example, in the computerized system 205 and/or on the server 220.

Step 913 discloses generating a second pitch estimation per note. The second pitch estimation is a calculation of an average of all per-frame pitch values computed by first pitch estimation 911 over all frames between the beginning time and the end time of the vowel state of each note-syllable. According to one embodiment, the said average pitch value may be used or determined as the analyzed pitch value corresponding to the sung note.

In some exemplary embodiment of the subject matter, the per-note pitch values undergo further normalization to refine the feedback. This normalization is related to the characterization of what is considered a "correct" pitch for purpose of feedback to the singer. e.g., when the sung note is in tune, and when it is out of tune. In some cases, the singer may generate notes that are perfectly aligned relative to each other but are out of tune relative to the absolute music scale. For example, on a musical scale where "La" of the fourth Octave is at a frequency of 440 Hz. According to such embodiment, it is preferred to provide a feedback to the user that comprises only the error in the relative pitch of the sung notes. An offset of the absolute pitch of the sung notes is estimated from the average difference or average ratio between the reference and analyzed pitch values over all the sung notes. The absolute pitch offset may be used to generate a normalized analyzed pitch value per note, e.g. by subtracting the absolute pitch offset from the analyzed pitch or by dividing the analyzed pitch by the absolute pitch offset.

Step 914 discloses generating a timing and duration determination based on the syllable segmentation. In some cases, the beginning time of each recognized syllable is taken to be the analyzed timing of the corresponding sung note. In some cases, the difference between an end timing and a begin timing of each syllable may be used to calculate the duration of the corresponding sung note.

Step 915 discloses generating intensity estimation. In some cases, the intensity of each note is computed as the ratio between the power of each note to the average of the per-note powers over the note sequence, and where the per-note power is computed as the average signal power between a begin and end timing of each note-syllable.

Figure 10:
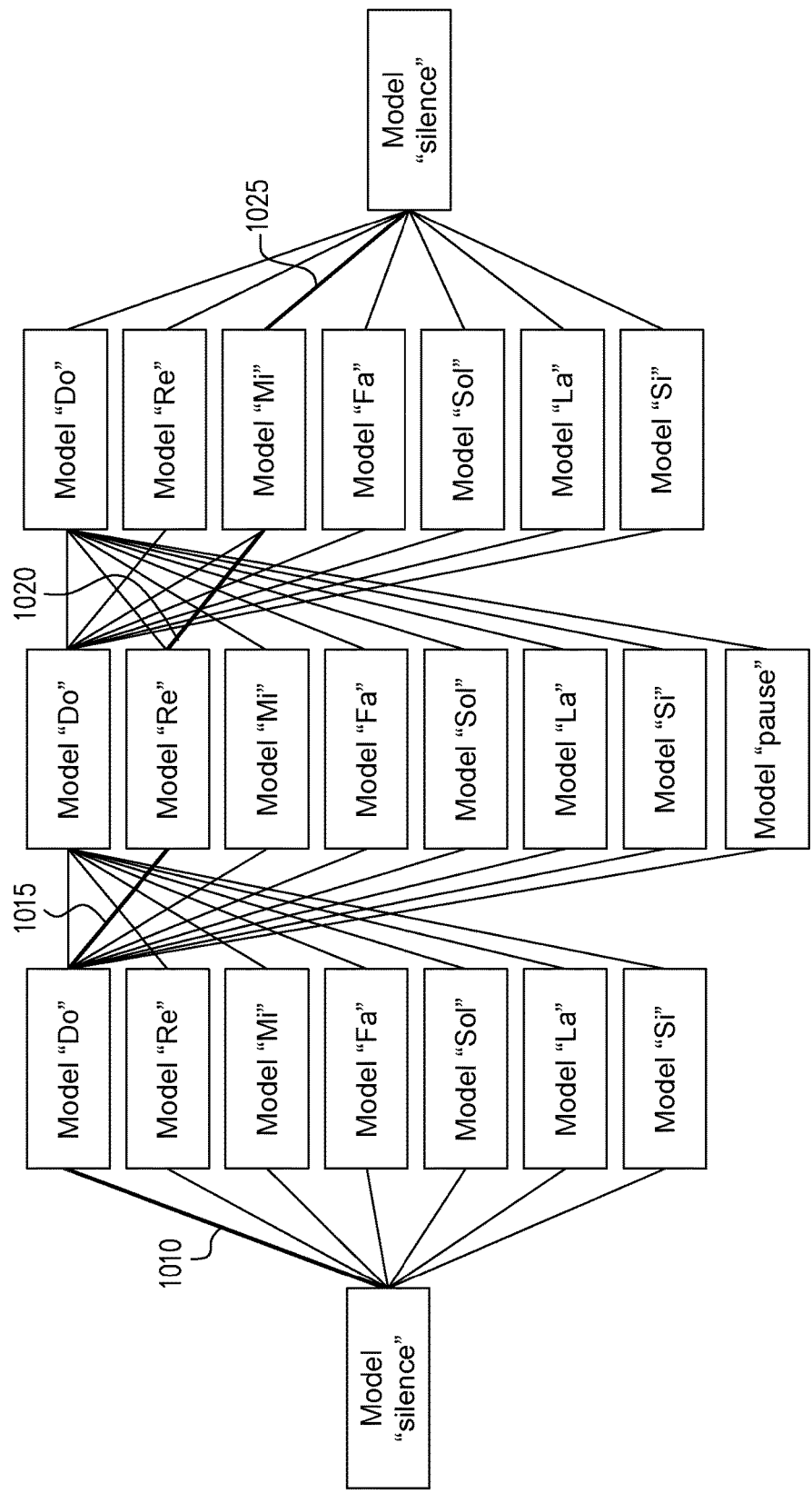
FIG. 10 shows a non-limiting exemplary configuration of transition probabilities between syllables for a syllable recognizer, according to some exemplary embodiments of the subject matter; and, FIG. 11 shows an example of a feedback music sheet display, according to some exemplary embodiments of the subject matter.

FIG. 10 shows a non-limiting exemplary configuration of transition probabilities between syllables for a syllable recognition operation 912, according to some exemplary embodiments of the subject matter. This example may be used to configure Pe parameter, e.g. to allow the syllable recognition operation 912 to detect erroneous sequences, but weight such erroneous sequences with lower probability.

In the example shown here, the reference syllable sequence is "do-re-mi". The transition probabilities corresponding to the reference sequence are assigned a higher probability Pe, as indicated by bold lines 1010, 1015, 1020, 1025. FIG. 10 shows a visual illustration of some of the possible transition probabilities using thin lines. The transitions are shown, for this example, to and from the syllable "do". This example illustrates that the reference syllable sequence is used to determine the most probable syllable sequence that in the sung audio recording. It is noted that in some exemplary embodiments of the subject matter the grammar is completely free without any constraints on the transition probabilities.

FIG. 11 shows an example of a user performance assessment and feedback display according to some exemplary embodiments of the subject matter. In some exemplary embodiments of the subject matter, the feedback may consist of a feedback or valuation music notation sheet which is similar to the reference music notation sheet, but where the visual representation of note properties, e.g. using the displayed note positions, sizes, emphasis and/or colors are related to the assessed accuracy of the analyzed pitch, timing, duration and intensity of the corresponding notes in the analyzed recording.

The feedback music sheet displays 1100 provides a music notation sheet 1101, which provides the original music notation of the reference music data object. The music notation sheet 1101 provides a reference display 1105. e.g. the actual notes, with pitch, duration, intensity, tempo, and the like. The music sheet displays 1100 comprises a feedback display 1106, which provides the feedback generated according to the user's inputted performance. For example, the feedback is provided by placing the note display 1106 below or above the reference 1105 if the analyzed pitch is too low or too high, and by coloring of the note display to denote whether the pitch is correct, e.g., green when the pitch is correct or red when the pitch is incorrect. The feedback display 1106 may provide feedback in the form of written text, e.g. "correct pitch", "correct syllable", or the like.

In some exemplary embodiments of the subject matter, the feedback layer may provide a secondary feedback display 1110, which provides the feedback according to pair of wave lines display 1112. For example, when the duration of the sung note is too short, the wave lines display 1112 are displayed as short, when the duration of the sung note is too long, the wave lines display 1112 are displayed as long. When the sung note is started late, the wave lines begin after the note display. When the intensity is decrescendo or crescendo the wave lines are shown converging or diverging, respectively. In some cases, the display may provide another feedback for duration by modifying the note shape according the custom music notation. For example, if the reference note was a quarter note and the analyzed duration was more like a half note, the feedback notes 1106 will have a non-solid shape rather than a solid shape.

The terms 'processor' or 'computer', or system thereof, are used herein as ordinary context of the art, such as a general purpose processor or a micro-processor. RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function (s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

Terms in the claims that follow should be interpreted, without limiting, as characterized or described in the specification.

While the disclosure has been described with reference to exemplary embodiments, it will be understood by those skilled in the art that various changes may be made and equivalents may be substituted for elements thereof without departing from the scope of the subject matter. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this subject matter, but only by the claims that follow.

The invention claimed is:

1. A computerized system to assist teaching and learning a written music language the system comprising:
   a processor configured to:
      obtain a reference music data object, wherein the reference music data object comprises one or more notes, said one or more notes comprises one or more note properties;
      extract the one or more note properties from the reference music data object;
      determine an associated reference syllable sequence based on the one or more note properties;
      generate a visual music notation according to the one or more note properties;
      generate a synthesized solfege singing sound according to the determined reference syllable sequence and the one or more note properties;
   a display unit configured to:
      display the visual music notation;
   an audio generation unit configured to:
      output the synthesized solfege singing sound to a user of the computerized system; and
   a recording unit configured to:
      obtain an audio recording of one or more notes sung in solfege by a user,
   wherein said processor is further configured to:
      recognize one or more sung syllables and corresponding pitch of the one or more sung syllables; and
      analyze the audio recording of the one or more notes, according to the one or more recognized sung syllables and corresponding pitch of the one or more sung syllables, to generate an analyzed music data object corresponding to the reference music data object and to the reference syllable sequence.

2. The computerized system of claim 1, further configured to:
   compare the analyzed music data object with the reference music data object and with the reference note syllable sequence, to determine an accuracy level of the audio recording;
   assess the accuracy level of the analyzed music data object; and,
   display, via the display unit, an accuracy assessment of the audio recording to a user.

3. The computerized system of claim 2, wherein the accuracy assessment of the audio recording comprises at least a pitch assessment and a syllable identity assessment.

4. The computerized system of claim 2, wherein the accuracy assessment of the audio recording further comprises an intensity assessment or a duration assessment.

5. The computerized system of claim 4, further comprising a communication unit configured to obtain a reference music data object from a server.

6. The computerized system of claim 1, further configured to provide a dynamic visual indicator displayed along the visual music notation simultaneously with a corresponding note in the synthesized solfege singing sound, to enable a user to follow the music notation while the synthesized solfege sound is audibly generated.

7. The computerized system of claim 1, wherein the one or more note properties comprise at least one of: a note pitch, note duration, note intensity, a note syllable, note timing, and a combination thereof.

8. The computerized system of claim 1, further comprising a storage unit configured for storing reference music data objects.

9. The computerized system of claim 1, wherein the processor is further configured to generate a reference music data object from an input file.

10. The computerized system of claim 1, wherein the reference music data object is a musicXML file or a standard MIDI file.

11. The computerized system of claim 1, wherein the recognizing is further depending upon a ratio between a probability that a reference syllable sequence has been sung and a probability that any other syllable sequence has been sung, wherein said ratio is greater than 1.

12. The computerized system of claim 1, wherein the recognizing is further configured to use a set of acoustic features, wherein the set of acoustic features includes a pitch value or a periodicity-measure value.

* * * * *